United States Patent [19]

Katsuya

[11] 4,122,601

[45] Oct. 31, 1978

[54] PORTABLE SEPARABLE GRASS AND BUSH CUTTER

[75] Inventor: Kazunari Katsuya, Okayama, Japan

[73] Assignee: Kaaz Machinery Co., Ltd., Okayama, Japan

[21] Appl. No.: 765,914

[22] Filed: Feb. 7, 1977

[30] Foreign Application Priority Data

Feb. 6, 1976 [JP] Japan .............................. 51-13116[U]
May 29, 1976 [JP] Japan .............................. 51-69032[U]

[51] Int. Cl.² ........................ B26B 25/00; B27B 9/00
[52] U.S. Cl. ......................... 30/296 A; 30/166 R; 30/276
[58] Field of Search ............... 30/166, 276, 296 R, 30/296 A; 192/108, 45; 64/9 R; 285/409; 7/14.55; 24/81 CC

[56] References Cited

U.S. PATENT DOCUMENTS

| | | | |
|---|---|---|---|
| 2,689,141 | 9/1954 | Kiekhaefer | 285/409 |
| 3,657,813 | 4/1972 | Knight | 30/296 |
| 3,732,957 | 5/1973 | McEwen | 192/45 |
| 3,832,796 | 9/1974 | Cardwell | 24/81 CC |

*Primary Examiner*—Jimmy C. Peters
*Attorney, Agent, or Firm*—Koda and Androlia

[57] ABSTRACT

A portable separable grass and bush cutter including a multisection elongated main pipe, a power source provided at one end of the main pipe, a cutting means provided on the other end of the main pipe, a multisection main shaft housed within the main pipe for transmitting power from the power source to the cutting means and a means for coupling together the section of the multisection main pipe and for coupling together the sections of the multisection main shaft.

8 Claims, 13 Drawing Figures

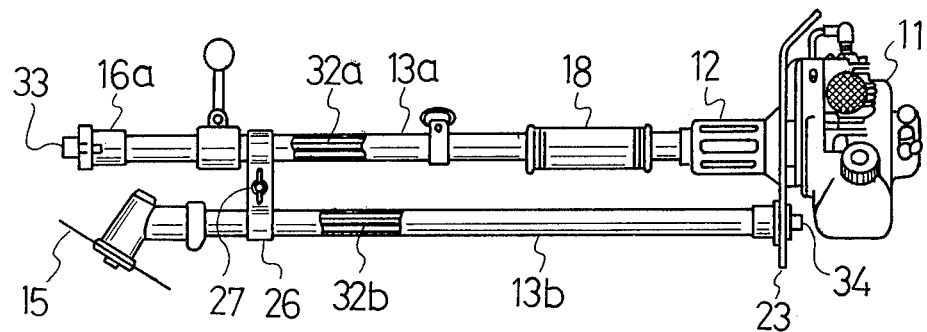
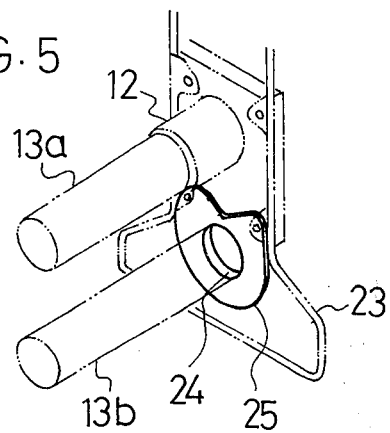
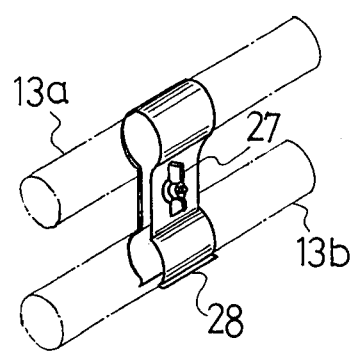
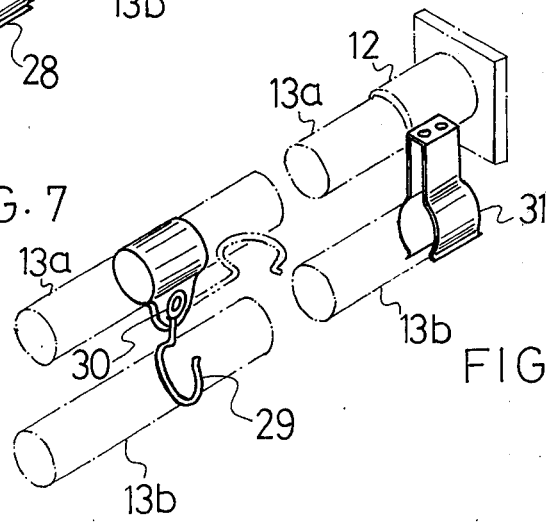

PORTABLE SEPARABLE GRASS AND BUSH CUTTER

BACKGROUND OF THE INVENTION

1. Field of Invention

The present invention relates to portable grass and bush cutters and more particularly to portable grass and bush cutters which may be easily separated into two or more pieces.

2. Prior Art

Grass and bush cutters are well known in the art. Such prior art grass and bush cutters include a main pipe having at respective ends thereof a power source such as an engine, a cutter blade, a main shaft housed by the main pipe for transmitting driving torque from the power source to the cutting blade and a main pipe grip or handle grip provided on the main pipe for ease of handling by the operator. The cutting blade may either be a rotary cutting blade or reciprocating cutting blades for pruning soft trees and leaves of, for example, oil palm trees or fruit trees. Thus, in order to facilitate the pruning of tall trees, the cutter must have a length sufficient to reach approximately 2 meters. Since the conventional grass and bush cutter must be of this length and carries at one end an exposed sharp blade, it is relatively difficult to store, transport and is dangerous.

In order to overcome these difficulties, it has been proposed that a grass and bush cutter having a separable main pipe and main shaft could be designed with joints for selectively connecting and disconnecting the pipe and shaft assemblies for easier storage and transportation and to also obtain an length sufficiently large to reach objects on tall trees.

However, due to the fact that the main pipe and main shaft are arranged in a double structure, one within the other, making such a separable grass and bush cutter is extremely difficult and such a separable grass and bush cutter has not been realized. In particular, a simple joint structure which would enable an easy and instantaneous attaching and detaching of the sections without causing a deterioration in power transmission and a shortening of the life of the grass and bush cutter has not been done.

Furthermore, in the conventional prior art grass and bush cutters, the cutter is placed in a bag. Although such bags provide a convenient housing for the attachments for a grass and bush cutter, the size of the bag for conventional grass and bush cutters is very large and therefore presents its own difficulties.

SUMMARY OF THE INVENTION

Accordingly it is the general object of the present invention to provide a grass and bush cutter which is separable into at least two sections.

It is another object of the present invention to provide a separable grass and bush cutter which is easy to store and transport.

It is still another object of the present invention to provide a simple, reliable joint assembly for a separable grass and bush cutter.

In keeping with the principles of the present invention, the objects are accomplished by a unique, portable, separable grass and bush cutter including a multi-sectioned elongated main pipe, a power source provided at one end of the pipe, a cutting means provided on the other end of the pipe, a multi-sectioned main shaft housed within the main pipe for transmitting power from the power source to the cutting means and a means for coupling together sections of the multi-section main pipe and for coupling together the sections of the multi-sectioned main shaft.

In the preferred embodiment, the means for coupling together the sections of the multi-sectioned main pipe and for coupling together the sections of the multi-sectioned main shaft include a flanged joint provided on each end of each section of the main pipe, a clutch portion provided on each end of each section of the main shaft which engages with the corresponding clutch portion on the next section of the main shaft and a clamp which provides a clamping force around each flanged end for clamping together the sections of the main pipe.

BRIEF DESCRIPTION OF THE DRAWINGS

The above-mentioned features and objects of the present invention will become more apparent by reference to the following description taken in conjunction with the accompanied drawings, wherein like reference wherein like referenced numerals denote like elements and in which:

FIG. 4 is a side elevational view of a two-piece grass and bush cutter of FIG. 1 assembled into two pieces for easier storing and transportation;

FIG. 5 is an inclined view showing different forms of supporting members utilized on the grass and bush cutters of FIGS. 1 and 2;

FIG. 6 is an inclined view showing one embodiment of a clamping member for the embodiment of FIGS. 1 and 2;

FIG. 7 is an inclined view showing a second embodiment of a clamping member for the grass and bush cutters of FIGS. 1 and 2;

FIG. 8 is another embodiment of a supporting member for the embodiment of FIGS. 1 and 2;

FIGS. 12 through 12d are side elevational views of dog clutches adapted for use in the joint structures of FIGS. 10 and 11.

DETAILED DESCRIPTION OF THE INVENTION

Figure 1A:
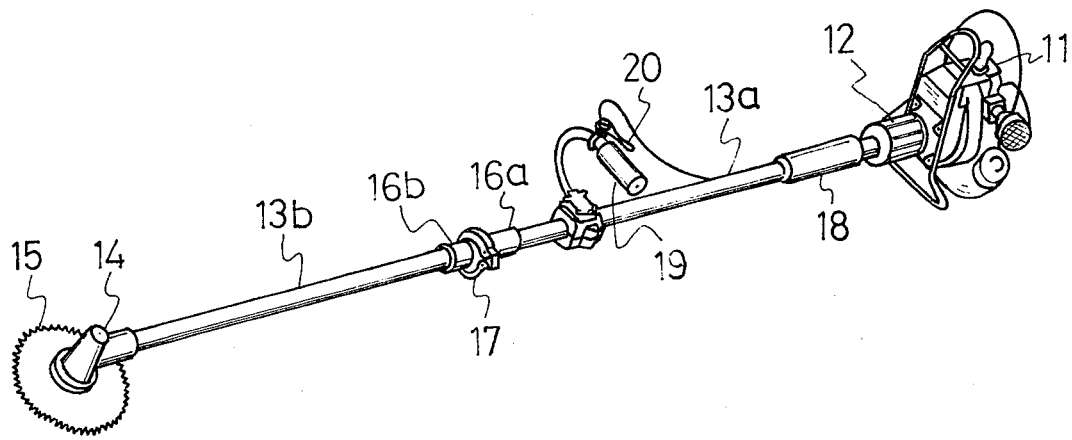
FIG. 1a is a prospective view of an assembled two-piece grass and bush cutter in accordance with the teachings of the present invention.
Figure 2:
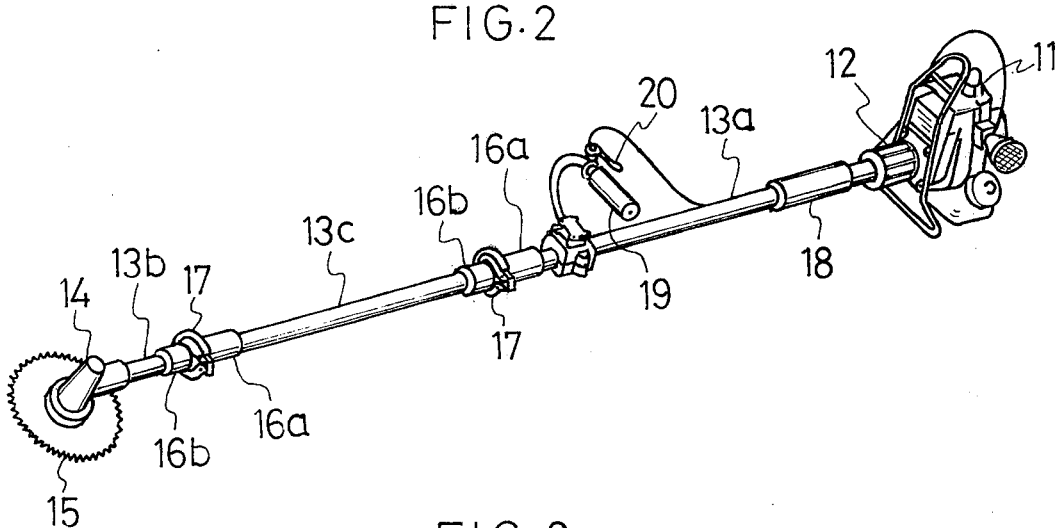
FIG. 2 is a perspective view of an assembled three-piece grass and bush cutter in accordance with the teachings of the present invention.
Figure 1B:
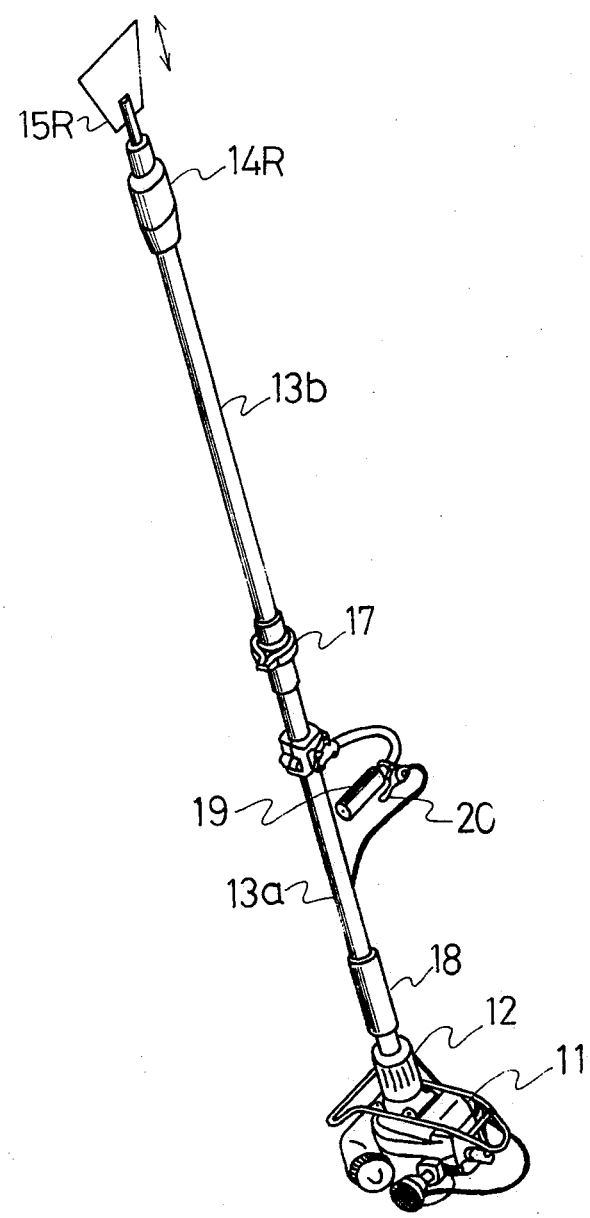
FIG. 1b is a perspective view of an assembled two-piece grass and bush cutter in accordance with the teachings of the present invention having a reciprocating blade cutter.

Referring more particularly to the drawings, shown in FIGS. 1a, 1b and 2 are perspective views of grass and bush cutters in their assembled states. The grass and bush cutters include a small sized internal combustion engine 11 as a power source. Perferably the internal combustion engine 11 is of the two-stroke variety having a displacement of 22.6 cc and produces a maximum of 1.2 horsepowers and a nominal value of 0.8 horsepower. The case 12 housing a centrifugal clutch associated with engine 11 is located adjacent the engine 11. An elongated main pipe 13 extends from the case 12. The end of elongated main pipe 13 supports a case 14R for housing a bevel gear for allowing the rotary cutter 15 to be tilted at any desired angle suitable for cutting or pruning. In the embodiment of FIG. 1b wherein a reciprocating cutter blade is utilized, the case 14 houses a cam or crank instead of a bevel gear.

The grass and bush cutter shown in FIGS 1a and 1b is designed to be separated into two pieces, an engine-side main pipe piece 13a and a blade-side main pipe piece 13b. Whereas, the main pipe 13 of the embodiment of FIG. 2 is arranged to be disassembled into three separate pieces, an engine-side main pipe piece 13a, a blade-side main pipe piece 13b and an intermediate main pipe piece 13c. In the embodiment of FIGS. 1a and 1b the blade-side and engine-side main pipe pieces 13a and 13b are coupled together by a single pair of joints 16a and 16b; whereas in the embodiment of FIG. 2 the engine-side, blade-side and intermediate main pipe pieces 13a, 13b and 13c are coupled together by two pairs of joints 16a and 16b. Clamps 17 hold the adjacent main pipe pieces togeather in a unitary structure.

The engine-side main pipe piece 13a is provided with a main pipe grip 18 and a handle grip 19. A throttle lever 20 is located in the vicinity of handle grip 19. The grips 18 and 19 are gripped by respective hands of the operator for performing grass removing and similar works.

Figure 3:
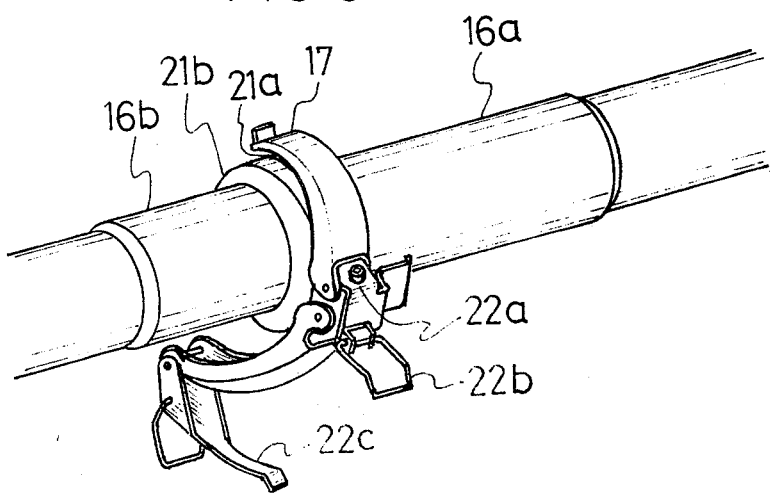
FIG. 3 is a perspective view of a clamp for a joint portion of a grass and bush cutter in accordance with the teachings of the present invention.
Figure 9:
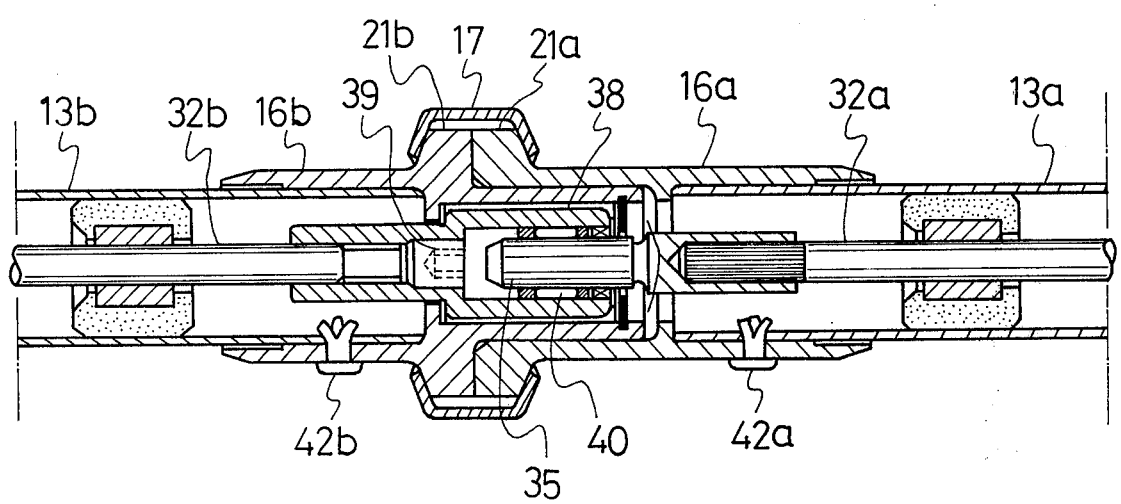
FIG. 9 is a cross-sectional view of one embodiment of a joint structure in accordance with the teachings of the present invention.
Figure 10:
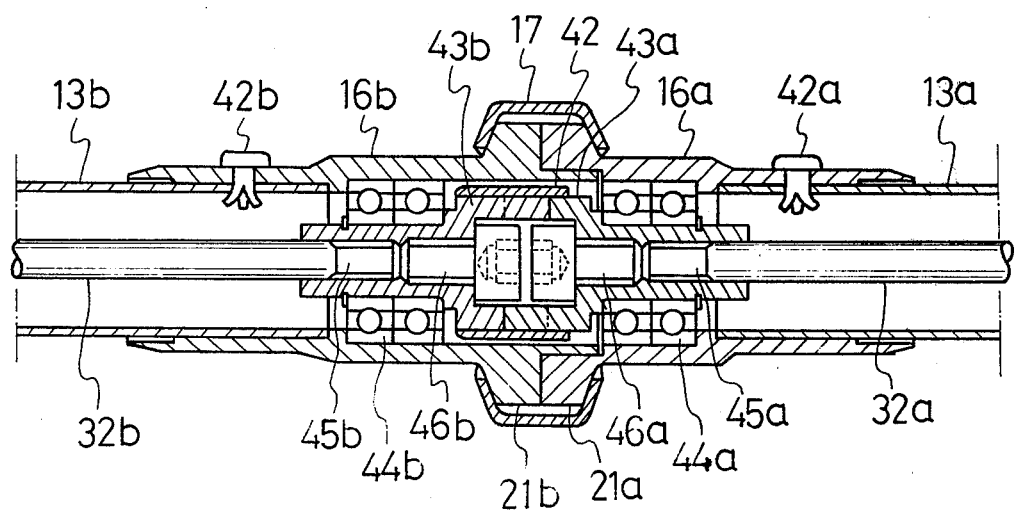
FIG. 10 is a sectional view of a second embodiment of a joint structure in accordance with the teachings of the present invention.

Referring to FIG. 3, shown therein is a detailed view of a clamp 17 for securing together two adjacent pieces of the main pipe such as engine-side and blade-side pieces 13a and 13b. Flanges 21a and 21b are provided on the respective joint 16a and 16b. The clamp 17 is arranged in FIG. 3 to clamp onto the flanges 21a and 21b. The clamp 17 is further provided with an adjustment screw 22a for finally adjusting the circumferential size of the clamp 17 by varying the distance between the two portions of the clamp 17. Furthermore, a lock spring 22b is adapted to cooperate with the clamp lever 22c for preventing the clamp from accidentally opening during work by engaging with the bent upend of clamp lever 22c. The joints 16a and 16b of the main pipe 13 have longitudinal sections as shown in FIGS. 9 and 10. The construction for the joints 16a and 16b will be described in detail infra.

Referring to FIG. 4, shown therein is a side elevation view of a disassembled grass and bush cutter of FIG. 1a wherein the main pipe has been separated into engine-side and blade-side pieces 13a and 13b. The engine-side and blade-side pieces 13a and 13b are arranged in parallel and are held together at positions close to the engine 11 by a supporting member and at a point close to the joint 16a by a clamping member.

As shown in FIG. 5, the support member closer to the engine 11 consist of a supporting plate 25 having an opening or hole adapted to receive the main pipes piece 13b. The supporting plate 25 is secured to a stand 23 provided on the bush-cutter. The supporting plate 25 is preferably made of a plastic material for providing a support for the main pipe piece 13b by a simple insertion of the joint 16b.

Alternately, the supporting plate may be formed by a steel plate which consists of the lower part of the stand 23. The steel plate would have a hole 24 punched therein for recieving the main piece 13b. Furthermore, the receiving hole 24 would be preferably coated along its inner periphery with a ring of rubber or plastic.

As shown in FIG. 4, the clamping member closer to the cutter blade may consist of a clamping member 26 having two plates and a butterfly screw 27 extending therethrough. Accordingly turning the butterfly screw 27 clamps the main pipe pieces 13a and 13b between the respective plates of the clamping member 26.

Although the clamping member 26 may be removed from the main pipe 13a when the cutter is in use, it is of course within the scope of the present invention to use the bush cutter with the clamping member 26 attached to the main pipe 13. As shown is FIG. 6, the clamping member may be constructed from a spring plate clamper 28 which resiliently grips the piece 13a and which has a bolt with a butterfly screw 27 extending therethrough so that the other piece 13b can be clamped. Furthermore, as shown in FIG. 7 the clamping member may consist of only a spring wire clamper 29 shaped in a relative hook shape and pivoted on a point 30 so that it may be folded to lie beneath the main pipe 13 when the bush cutter is used in the manner shown by the dotted line. In the clamper 29 in FIG. 7 the main pipe piece 13b is inserted through the hook shaped portion and is resiliently gripped by the hook shaped portion of the clamper 29.

Referring to FIG. 8, a spring plate clamper similar to that shown in FIG. 6 may be used as the supporting member close to the engine. In such a case, the spring plate clamper 31 is secured to the lower side of the clutch case 12.

As further shown in FIG. 4, covering caps 33 and 34 are provided to cover the ends of the joints 16a and 16b. Such covering caps prevent the invasion of contaminants such as sand and mud which would cause a premature failure of the main shaft. In addition, it is preferable rotary cutter blade 15 be covered by a cover made of for example cloth.

Furthermore, it is preferred that the main pipe grip 18 be located near the center of gravity of the disassembled main pipe pieces when they are coupled together by the clamping member 26 and the support member. Therefore the disassembled cutter may be easily carried by the main pipe grip 18 and transported.

Referring to FIG. 9, shown therein is a joint structure for a separable bush cutter in accordance with the teachings of the present invention. In the embodiment of FIG. 9 for a joint structure a one way roller clutch is utilized. The joint structure of FIG. 9 includes a male joint 35 fixed by welding to a main shaft 32a. A female joint 38 is secured by means of a screw 39 to the other main shaft 32b. A roller clutch 40 is provided inside of a female joint 38 which receives the male joint 35.

Joint 16a is pressed onto piece 13a of the main pipe piece 13 while joint 16b is pressed onto piece 13b of the main pipe piece 13. The joints 16a and 16b are fixed respectively to the main pipe pieces 13a and 13b by means of caulking pins 42b and are adapted to be mated together by flanges 21a and 21b provided on joints 16a and 16b and abutting each other. The abutting flanges 21a and 21b are clamped into a unitary structure by clamp 17.

Accordingly, for disassembly the clamp 17 is first disengaged in the manner shown in FIG. 3 and the joints 16a and 16b are pulled away from each other so that the male joint 35 is slipped out from the inner periphery of the roller clutch 40 located within the female joint 38. Therefore, a simultaneous separation or division of the main pipe 13 and the main shaft into respective separate pieces is accomplished. The adoption of the roller clutch 40 in the joint structure considerably contributes to the ease of attaching and detaching the main shaft pieces. The one way roller clutch 40 also protects the main shaft from an extraordinary torque. Namely, if the engine happens to stall during the cutting work and the rotary cutting blade 15 continues by its inertia to rotate, the torque from the inertia of the rotary cutting blade is not transmitted to the engine and the main shaft is protected from this extraordinary reverse torque which would cause a distortion of the main shaft and/or a loosening of the transmission system. Therefore, this joint structure further provides an advantage of accurately centering the interconnected main shafts. Such a joint structure and the accurate centering which does not deteriorate with time has not here before been possible with the complicated structures available in prior art.

Referring to FIG. 10, shown therein is another joint structure wherein a dog clutch supported by conventional ball bearings is utilized. This structure is characterized by a rotary guide sleeve on the inner or outer of respectively either one of the clutch members for facilitating the mutual engagement of the clutch members.

Referring to FIG. 10, an outer rotary guiding sleeve 42 is provided on the clutch member 43b of the dog clutch for smoothly guiding the other clutch member 43a into engagement when the clutch members are brought into mutual engagement. The clutch members 43a and 43b are supported in the respective joints 16a and 16b by respectively ball bearings 44a and 44b. The clutch members 43a and 43b are secured to the main shaft pieces 32a and 32b by screws 45a and 45b. The direction of the threads of the screw 45a and 45b are so selected so as to tighten as the main shaft is rotated. Such screws 46a and 46b are provided for insuring the fastening of the clutch members. An outer rotary guiding sleeve 42 is pressed onto the outer periphery of the clutch member 43b and is in sliding engagement with the other clutch member 43a. As previously described the joint is provided with flanges 21b and 21a which are clamped together by clamp 17.

Figure 11:
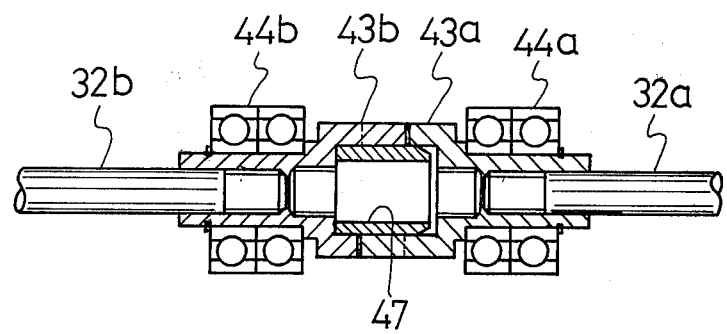
FIG. 11 is a sectional view of a third embodiment of a joint structure in accordance with the teachings of the present invention.

Referring to FIG. 11, shown therein is a modification in which the rotary guiding sleeve is provided at the inside coupling members 43a and 43b of the dog coupling. Namely, an inner rotary sleeve 47 is pressed into coupling member 43b of the dog coupling for sliding engagement with the inside of coupling member 43a in a similar manner to that of the outer rotary guiding sleeve 42 of FIG. 10.

Figure 12:
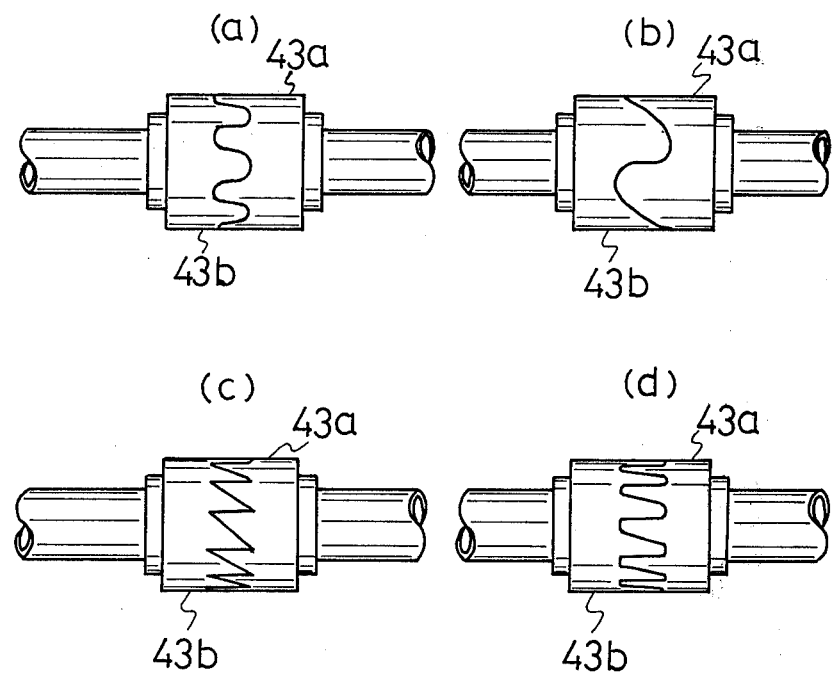

The dog coupling 43 may be any one of the known types including a boston gear as shown in FIG. 12a and the other various modifications of the dog coupling as shown in the FIGS. 12b through 12d.

In all of the embodiments, the rotary guiding sleeve 42 provides an easy and exact engagement of the coupling members thereby insuring a good centering of the main shaft pieces and avoiding extraordinary loads on the dog coupling itself and the bearings. Accordingly, the durability of the transmission system is improved.

As described above, the present invention provides novel joint structures for enabling a grass and bush cutter to be disassembled or separated into two or three separate pieces for facilitating the storing and transportation thereof as well as an improved means for supporting the pieces after disassembly. The three piece type of grass and bush cutter shown in FIG. 2 can incorporate intermediate main pipe and shaft assemblies of various lengths so as to render the grass and bush cutter available for wider use to thereby enhance the utility of the grass and bush cutter.

It should be apparent to one skilled in the art that the above-described embodiments are merely illustrative of but a few of the many possible specific embodiments which represent the applications of the principles of the present invention. Numerous and various other arrangements can be readily devised by those skilled in the art in accordance with these principles without departing from the spirit and scope of the invention.

I claim:

1. A portable grass and bush cutter comprising an elongated main pipe, a power source provided at one end of the main pipe, a cutting means provided at the other end of the main pipe and a main shaft housed within said pipe for transferring power from said power source to said cutting means, said portable grass and bush cutter characterized in that said main pipe together with said main shaft is arranged and configured to be separated into at least two pieces and is provided with a means for coupling together the sections of the main pipe and for coupling together the sections of the main shaft and a means for supporting parallel disposed disassembled sections of said bush cutter fixed to said cutter adjacent said power source and adjacent an end of a section of said main pipe.

2. A portable grass and bush cutter as claimed in claim 1 wherein said means for coupling together the sections of the main pipe and for coupling together the sections of the main shaft comprise flanged joints formed on the end of each section and abutting each other and a circumferential clamp for clamping together the abutting flanged joints.

3. A portable grass and bush cutter as claimed in claim 2 wherein said clamp comprises an adjusting screw for adjusting the clamping force around said flanged joint and a lock spring for preventing accidental disengagement of said clamp.

4. A portable grass and bush cutter according to claim 1 wherein said supporting means comprises a spring plate clamper provided adjacent said power source and coupled to a section of said main pipe and a spring wire clamper provided adjacent said other end of said section of main pipe and coupled thereto.

5. A portable grass and bush cutter according to claim 1 wherein said means for coupling together said main pipe and for coupling together said main shaft comprises a female joint coupled to one section of main shaft for accommodating a one-way roller coupling and a male joint coupled to another section of main shaft for detachable engaging with the inner periphery of said one-way roller coupling when said sections of main shaft and main pipe are coupled together.

6. A portable grass and bush cutter according to claim 1 wherein said means for coupling together said main shaft and for coupling together said main pipe comprises a disengageable dog clutch comprising clutch members provided on abutting sections of main shaft and an outer rotary guiding sleeve provided on the outer periphery of one of said clutch members.

7. A portable grass and bush cutter according to claim 1 wherein said means for coupling together said main pipe and for coupling together said main shaft comprise a separable dog clutch comprising clutch members provided on abutting sections of said main shaft and an inner rotary guiding sleeve provided in one of said clutch members of said dog clutch.

8. A portable bush and grass cutter comprising an elongated main pipe, a power source provided at one end of the main pipe, a cutting means provided at the other end of the main pipe and a main shaft housed within said main pipe for transferring power to said power source to said cutting means, said portable grass and bush cutter characterized in that said main pipe together with said main shaft is arranged and configured to be separated into at least two pieces and is provided with a means for coupling together the sections of the main pipe and for coupling together the sections of the main shaft and a means for supporting parallel disposed disassemled sections of said bush cutter disposed adjacent to said power source and of a section of said main pipe, said supporting means comprises a stand disposed adjacent to said power source and coupled to said main pipe, a supporting plate coupled to said stand and having a bore formed therein for receiving one end of a section of main pipe and a clamping member provided close to an end of a section of main pipe.

* * * * *